United States Patent [19]

Babb, Jr. et al.

[11] Patent Number: 4,602,810
[45] Date of Patent: Jul. 29, 1986

[54] TIE LUG

[76] Inventors: Howard R. Babb, Jr., 3627 Darbyshire Dr., Columbus, Ohio 43220; James D. Ford, 1479 Blaine Dr., Columbus, Ohio 43227

[21] Appl. No.: 714,036

[22] Filed: Mar. 20, 1985

[51] Int. Cl.[4] .............................................. F16L 13/04
[52] U.S. Cl. .................................. 285/114; 285/337; 285/374; 285/422; 148/135
[58] Field of Search ............... 285/114, 422, 337, 374; 148/135

[56] References Cited

U.S. PATENT DOCUMENTS

| 3,010,736 | 11/1961 | Dilley . |
| 3,144,261 | 8/1964 | Stephens . |
| 3,374,012 | 3/1968 | Metcalfe . |
| 4,099,994 | 7/1978 | Ikawa ................................. 148/35 |

FOREIGN PATENT DOCUMENTS 148237  5/1981  Fed. Rep. of Germany ........ 148/35

OTHER PUBLICATIONS

The Effect of Heat Treatment ... in Austempered Ductile Irons, Journal of Heat Treating, vol. 4, No. 1, 6/1985 pp. 7–24.

Primary Examiner—Dave W. Arola
Attorney, Agent, or Firm—Sidney W. Millard

[57] ABSTRACT

This invention relates to a lug for anchoring the end of a tie rod at a bell flange and spigot pipe joint and for sealing more effectively the bell flange and spigot joint. One portion of the lug is positioned on a bolt which connects the bell flange and a gland and is inserted between said bell flange and said gland. The other end of the lug is formed to hold securely the end of a tie rod. The tie lug is designed in such a manner that when the tie rod is tightly anchored to the lug, pressure is thereby exerted on the gasket between the bell flange and the gland with the result that a more effective seal is achieved.

4 Claims, 5 Drawing Figures

TIE LUG

FIELD OF THE INVENTION

This invention relates to a pipe coupling of the bell and spigot type.

BACKGROUND OF THE INVENTION

Methods of securing together sections of pipe and fastening flanges and glands are highly developed. The bell flange of one pipe and the gland on an adjoining pipe are usually held together by bolts and nuts. Such a pipe joint is illustrated in U.S. Pat. No. 3,374,012 to Metcalfe et al and this invention is an improvement on that joint.

Often it is necessary or desirable to use tie rods to connect the two pipe components themselves (as distinguished from the connection between the flanged bell formed on the end of one pipe component and the gland which simply encircles the end of the other pipe component). Such tie rods are desirable to oppose the tendency of internal fluid pressure to cause separation of adjoining pipes at the joints. The force tending to separate the pipe sections is the pressure times the maximum cross-sectional area at the joint. Tie rods are also desirable for the reason that they are able to span intervening coupling flanges of such other pipe installations as valves, T-fittings and the like.

The tie lug herein described and claimed constitutes an improvement in the art because, not only does it anchor a tie rod in an improved manner, thus preventing relative movement among the sections of pipe, but it also effects a better seal for the joint to which it is attached. The tie lug performs these several functions in a much simpler and more effective manner than does the prior art.

P. D. Dilley in U.S. Pat. No. 3,010,736 discloses a rod bracket for use in anchoring tie rods. In column 3, line 2 of his patent, Dilley states that an unexpected advantage of his invention is the increased pressure on the packing ring used to seal the joint. Dilley's invention does sucessfully anchor tie rods and does increase the pressure on the packing ring; however, there are several weaknesses in Dilley's bracket which the inventor was unable to eliminate. All forces created by the tightening of the nut on the end of the tie rod and the nut on the end of the T-bolt are exerted on the head of the T-bolt, which in turn is pulling against the threads on the T-bolt nut. The threads of the single T-bolt holding the bracket in place are thus subjected to a high shearing stress. The is an unfortunate situation, for should the T-bolt fail, not only would the tie rod become unanchored, but the joint would become substantially weakened and might leak. Also, Dilley's bracket is formed with a special aperture which requires that a special T-bolt be used for connecting the bell flange to the gland rather than the standard bolt which is used at other points on the same joint.

C. S. Stephens in U.S. Pat. No. 3,144,261 discloses an eye-bolt securing device for use in anchoring the ends of tie rods. It would seem that by tightening the nuts on the end of the tie rod one would also increase the pressure of the gland on the packing. However, the problem inherent in this invention is that the eye portion of the bolts are incapable of withstanding high tension. When a high pressure is exerted on the joint or a strong force on the tie rod, the eye bolts will pull open because of their open stems.

SUMMARY OF THE INVENTION

A convention bell and spigot type pipe joint includes a gasket filling a cavity between the bell of one pipe section and a gland circumscribing the spigot section of the other pipe section. This invention adds a reinforcing structure to redisribute the tension in the joint connecting T-bolts equally and also reduce overall tension on the individual connecting bolts.

A lug fits into the slot between the face of the bell and the opposing face of the gland. Two holes through the lug accommodate bolts, one bolt connects the adjacent bell and gland while the other bolt connects to another lug similarly disposed in the next longitudinal joint. The lugs, bells, spigots, glands and gaskets are so arranged that one end of each lug tilts toward the other lug while the other end of each lug presses against the adjacent gasket.

It is, therefore, an object of our invention to provide a tie lug which firmly anchors the end of a tie rod and which cooperates with the gland to effect a strong seal for a pipe joint.

It is another object of provide a tie lug which is easy to install and which does not require any special bolts other than those already in use with the joint, in order that the lugs be held in place.

It is another object to provide a tie lug which will securely hold the tie rod and effect a strong seal when the tie rod is subject to high tension or the joint is subject to high pressure.

It is a further object of our invention to provide a tie lug which distributes the forces acting on the lug to other parts of the joint and does not concentrate all of them on one point.

Further objects and feastures of our invention will be apparent from the following specification and claims when considered in connection with the accompanying drawings illustrating several embodiments of our invention.

IN THE DRAWINGS

DESCRIPTION OF THE PREFERRED EMBODIMENT

Figure 1:
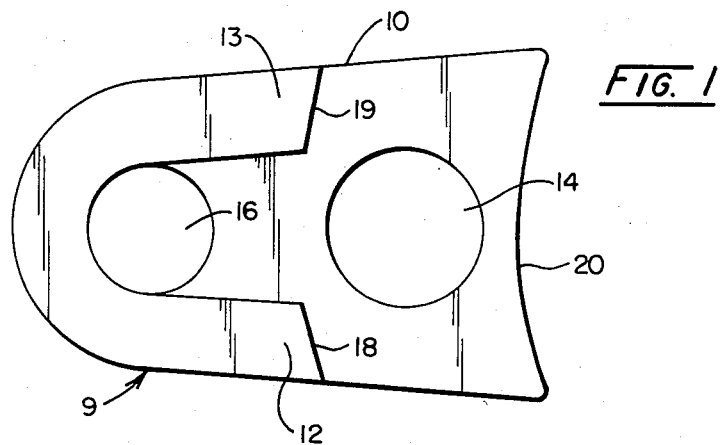
FIG. 1 is a horizontal plan view of the tie lug.

Turning now to the specific embodiment of the invention selected for illustration in the drawings, it can be seen that our improved tie lug, designated generally by the number 9, consists of a body 10 having reaised flanges or shoulders 12 and 13. The body 10 contains two holes of different size, hole 14, the larger, is in the lower portion of the body 10 and hole 16 in the upper portion of the body 10. The bases 18 and 19 of the shoulders 12 and 13, respectively, are planer while the base of the body 10 is curved inwardly as at 20. The curved surface makes for a better fit around the gland.

Figure 3:
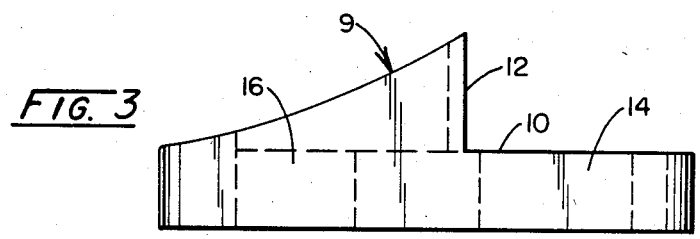
FIG. 3 is a side elevation view of the tie lug.
Figure 2:
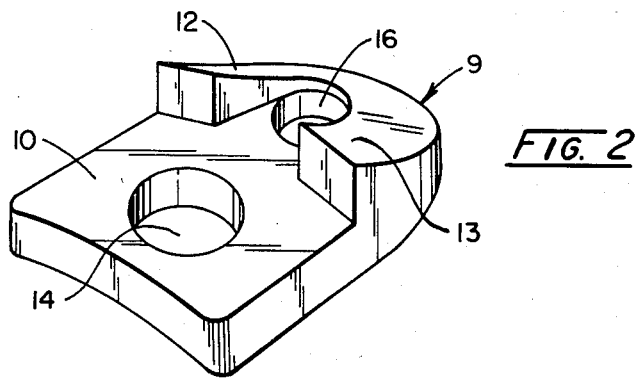
FIG. 2 is a view in perspective of the tie lug.

It will be noted that the shoulders 12, 13 merge in a horseshoe shape and are of uniform width in the view of FIG. 1. The curved (concave) profile of the shoulders, best illustrated in FIG. 3, reduces the amount of metal required in the casting. The horseshoe shape tapers from a height of about three-quarter inches (1.8 cm.) to zero above the smaller of the two holes 16. Body 10 is only about one-half inch thick (1.27 cm.) and the strength characteristics required of the tie lug 9 have resulted in the interdependent dimensional relationships which have been found to be critical as will be explained subsequently. However, the tie lug 9 is designed to be structurally sound in use with pipe of four to eight inch diameter. With a four inch diameter pipe there will be two lugs per joint, with a six inch diameter there will be four lugs per joint, and with an eight inch diameter there will be six lugs per joint.

With respect to the hole sizes, hole 16 has a diameter of thirteen-sixteenth inch (about 2.05 cm) while hole 14 has a diameter of one inch (about 2.54 cm). Either hole will accommodate bolts of three-quarters inch but hole 14 will accommodate a slightly larger bolt, if appropriate. The larger size of hole 14 also allows the desirable tilting of the lug 9 relative to the inserted bolt which will be explained subsequently.

Figure 4:
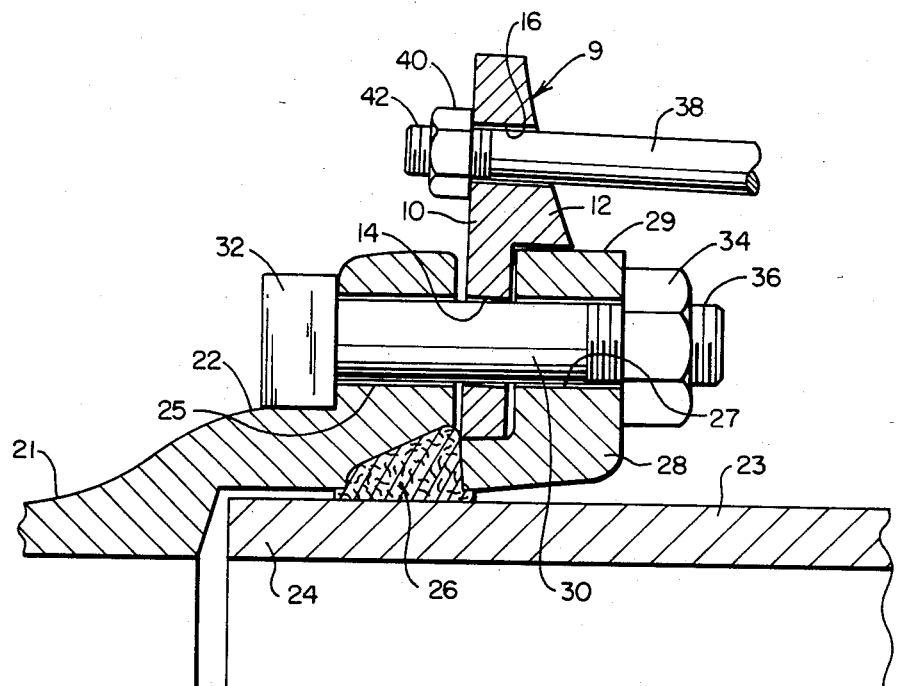
FIG. 4 is an elevation view of a pipe coupling to which is attached our improved tie lug, parts of the drawing being in section.

In FIG. 4 can be seen parts of the coaxial pipes 21 and 23 which are formed with the bell flange 22 and spigot end 24, respectively. Between the adjoining ends, bell flange 22 and spigot end 24, there is a gasket 26 which is held in place in a cavity in the bell flange by means of an annularly extending abutment projecting from gland 28 which is spaced from the bell flange 22. Several T-bolts, such as the T-bolt 30 with a head 32 and a nut 34 secured on threads 36, prevent any relative motion between flange 22 and gland 28. The tie lug 9 is positioned between the bell flange 22 and gland 28 in such a manner that one T-bolt, here T-bolt 30, extends through the hole 14 and the tie rod 38 extends through the hole 16. A nut 40 is turned on the threads 42 on the end of the tie rod until the tie rod 38 is firmly anchored to our tie lug 9.

The standard spacing between the faces of the assembled bell flange 22 and gland 28 is about nine-sixteenths to five-eights inch (1.45–1.58 cm). Thus the body 10 will slide into the gap with some play on either side.

The problem solved by this unique structure is one of using the right materials, with the right strength characteristics, shaped in the right proportions to withstand the commercial environment required.

The lug cannot be flat, it would snap off at the outer surface 29 of the gland 28. It cannot be made thicker to withstand the forces because there is no extra space between the faces of the bell and gland. Faces 18, 19 on shoulder 12, 13 prevent that snapping by having point contact with surface 29, one point contact on each side of bolt 30. Because of the described planer surface of faces 18, 19, curved surfaces 20, and the flat shape of body 10, the lug will have line contact with th gasket 26 and possibly the face of flange 22, line contact with the opposing face of gland 28 at surface 29 and point contact between surface 29 and each face 18, 19. The result is a reduction of tension in some bolts 30 and a balanced transfer of some tension to rod 38 and the other bolts 30.

To achieve the strength, resilience, hardness and resistance to corrosion for our lug we use a ductile iron casting made of ASTM A536 Grade 65-45-12 except for some modifications which may be noted. The apporximate composition of the alloy by weight is as follows:
Carbon: 3.5–3.8
Manganese: 0.20–0.30
Sulfur: 0.01–0.02
Silicon: 2.5–2.65
Phosphorus: 0.01–0.025
Magnesium: 0.04–0.06
Iron: balance Chemical compositions, while allowing a somewhat limited range of materials, is subordinate to microstructure and mechanical property requirements. All mechanical property requirements are to be met in the "as cast" condition. Those minimum properties required for acceptable performance are:
Tensile strength: 65,000 psi
Yield strength: 45,000 psi
Elongation: 12%
Brinell Hardness: 170–207 HB The microstructure in the casting must be ferritic-pearlitic with a nodularity in excess of 90% and no free carbides are permitted in the critical areas (from surface 20 to above faces 18, 19 and not near the contact areas of the faces 18, 19).

OPERATION

In operation, the ends 22 and 24 of the pipe 21 and 23, respectively, are brought into coaxial alignment, but before the spigot end 24 is telescoped into the bell flange end 22, the gland 28 and gasket 26 are slipped into the periphery of the pipe 23. The spigot end 24 is then moved into the bell flange end 22. The tie lug 9 is positioned between the bell flange 22 and the gland 28 in such a manner that the bolt hole 25 in the bell flange 22, the hole 14 in our tie lug 9, and the bolt hole 27 in gland 28 are in alignment. When the tie lug 9 is in this position, the shoulders 12 and 13 should extend over the outer surface 29 of the gland 28. A plurality of T-bolts 30 are then inserted through each set of the three aligned holes of the bell flange, tie lug, and gland. The nuts 34 are then tightened on the threads 36 of the T-bolt 30. It should be noted that due to the unique construction of our tie lug it is quite impossible to install the lug in any position except the correct one.

A tie rod 38 can now be anchored by the tie lug 9 by inserting the end of the tie rod 38 through hole 16. The tie rod 38 is securely fastened to the tie lug 9 by means of the nut 40 and threads 42 on the end of the tie rod.

When the nut 40 has been substantially tightened, there is imparted to tie lug 9 a torque movement which forces the gland 28 into a much tighter contact with gasket 26. This torque movement is caused by the force of the tie rod 38 acting on lug 9 which pivots about its lower portion. The torque force is transmitted to gland 28 at the points at which the gland is contacted by the body 10 and the shoulders 12 and 13. It is to be noted that the hole 14 in the tie lug 9 is slightly larger in diameter than the T-bolt 32. This hole size not only allows the advantage of easy assembly and disassembly, but insures the fact that the tie lug 9 will be capable of pivoting on the T-bolt 30 so that the body 10 and shoulders 12 and 13 press against the face and peripheral surfaces of the gland 28.

Figure 5:
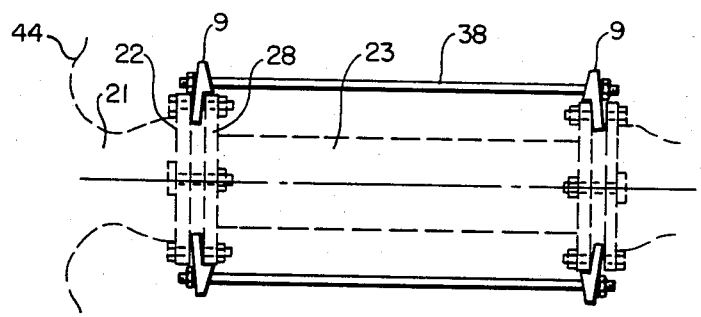
FIG. 5 is a plan view of two pipe joints utilizing our invention.

Another advantage of our invention is that it reduces the amount of force on the T-bolt head 32 and reduces the shearing stress on threads 36 from that of the prior art. This is explained by the fact that the force created by the tie rod 38 does not act only on the bolt 30. Instead the tension on the tie rod creates a torque on the tie lug 9 which is transmitted to gland 28. The torque on the gland 28 is distributed to the other bolts in use to connect the gland to the bell flange. Thus, all the bolts on the joint oppose the force of the tie rod 38, rather than just the one holding the tie lug in place. Hence, as a result of our tie lug 9, the shearing stress on the T-bolt head 32 and threads 36 is reduced and a tighter seal of the gasket 26 is attained. The force tending to separate the joint (pressure × cross-sectional area) is opposed by the forces in tension of bolts 30 and 38. FIG. 5 illustrates a section 21 of pipe having a change of flow direction at 44 and the section 23 of pipe bridges the gap between the two aligned bell ends of two sections of pipe where blowout is more likely to occur.

Another important advantage of our tie lug over the prior art is that no special flange bolts are required when our invention is used. All that is required for the use of our improvement is the tie lug itself, since it is designed for use with the standard pipe coupling, T-bolts and nuts.

We have found that the objects and advantages of our improvement can be best achieved in a tie lug which is made of ductile or nodular cast iron. A tie lug so made has a tensile and yield strength which allow the tie lug to absorb tremendous joint shocks caused by a sudden increase in pressure on the joint. Also, a ductile or nodular cast iron tie lug possesses a high corrosion resistance. Consequently, there is practically no electrolytic action in the lug itself and in the connection beteen bell flange, tie lug, and gland.

The objects and advantages of the invention herein described are best accomplished in a pipe coupling which comprises: (a) two coaxially aligned pipes with adjoining ends, one formed with an adjoining spigot end and the other formed with a bell flange, at its adjoining end; (b) a gland, peripherally surrounding the spigot end pipe and spaced from the bell flange of the other pipe; (c) a gasket for sealing said coupling, peripherally surrounding the spigot end pipe and positioned to bear on the adjoining end of said pipe having the bell flange; and (d) means for anchoring a tie rod into said coupling comprising a tie lug having a body positioned so as to have a lower portion thereof extend into the space between the gland and the bell flange, said body having two holes extending through said body, one hole in the lower portion of said body having a bolt extending therethrough and connecting said bell flange with said gland, and the second hole in the upper portion of said body having said tie rod extending therethrough.

As will be clear from an observation of FIG. 5, the invention is designed to bridge between two identical but oppositely facing bell and spigot joints. The innermost end of each lug is designed to press against a gasket in a direction opposite from the other lug in the combination. The joint is useful where there is a curve in the pipe line, a valve, a T or an L. The pressure within the pipe acts on all surfaces with equal force per unit area. Accordingly, a blowout is most likely to occur at a location where the pressure acts on a surface to push one section of pipe away from its adjacent section. The joint of this invention transfers the forces of separation to rods 38 and the lugs distribute the forces such that there is an equal and opposite force holding the pipe sections together.

It is to be understood that the detailed drawings and specific examples given describe preferred embodiments of our invention and are for purposes of illustration only, that the apparatus of the invention is not limited to the precise details and conditions disclosed, and that various changes may be made therein without departing from the spirit of the invention which is defined by the following claims.

We claim:

1. A pipe joint comprising,
   two pipe sections, each having fluid transmitting passages, each section having a bell-shaped end, said bell-shaped ends being coaxially aligned and facing toward each other,
   one said section including a means for changing the direction of flow of at least a part of a fluid flowing in the passages,
   a straight section of pipe with its ends extending into the two bell-shaped ends,
   each bell-shaped end including a radially extending flange,
   means forming a cavity in each flange,
   two gaskets, one circumscribing each end of the straight section and being in sealing engagement with the periphery of the straight section and the cavity in the adjacent bell end,
   two glands, each circumscribing the straight section, each gland being spaced from one adjacent bell end and including an annularly extending abutment configured to press the adjacent gasket into sealing contact with the cavity in the adjacent bell, the space between each adjacent bell and gland comprising a gap,
   each gland and each flange including a plurality of aligned holes, bolts extending through said holes, nuts threaded on said bolts and engaging said gland,
   a plurality of lugs mounted in each gap, each said lug having:
   (a) a pair of shoulders, each with a planer surface engaging the periphery of the adjacent gland, the height of the shoulders adjacent the gland being about 1.8 cm,
   (b) a body with parallel flat surfaces, one flat surface facing the flange and the other flat surface facing the gland, the surface of the lug nearest the straight section of pipe being curved to accommodate the periphery of the abutment of said gland, said body having a thickness of about 1.27 cm.,
   (c) the following physical properties:
      (1) a tensile strength over about 65,000 psi,
      (2) a yield strength over about 45,000 psi,
      (3) an elongation at yield of not less than about 12%,
      (4) a Brinell Hardness in the range 170–206 HB,
      (5) a microstructure of ferritic-pearlite with a nodularity in excess of 90% with no free carbides in the area inward of the shoulders nor in the shoulders adjacent the gland,
   (d) a percentage composition by weight in the range:
      Carbon: 3.5–3.8
      Manganese: 0.20–0.30
      Sulfur: 0.01–0.02
      Silicon: 2.5–2.65
      Phosphorus: 0.01–0.025
      Magnesium: 0.04–0.06
      Iron: balance
   (e) a hole aligned with a pair of aligned holes in the gland and flange and having a bolt extending therethrough, a plurality of threaded rods, each rod extending through an opening in a lug in each gap, nuts threadedly engaging each end of each rod and abutting the adjacent lug to place the rod in tension.

2. The pipe joint of claim 2 wherein the straight section is about 20 cm. in diameter and there are six rods symmetrically spaced around said straight section.

3. The pipe joint of claim 1 wherein the straight section is about 15 cm. in diameter and there are four rods symmetrically spaced around said straight section.

4. The pipe joint of claim 1 wherein the straight section is about 10 cm. in diameter and there are two rods symmetrically spaced around said straight section.

* * * * *